United States Patent [19]
McFall

[11] Patent Number: 4,793,462
[45] Date of Patent: Dec. 27, 1988

[54] MATERIAL LOADING APPARATUS

[76] Inventor: Robert M. McFall, P.O. Box 1282, Clintwood, Va. 24228

[21] Appl. No.: 48,729

[22] Filed: May 11, 1987

[51] Int. Cl.⁴ ............................................. B65G 37/00
[52] U.S. Cl. ..................................... 198/365; 198/802
[58] Field of Search .................. 198/365, 474.1, 477.1, 198/802, 706

[56] References Cited

U.S. PATENT DOCUMENTS

| | | | |
|---|---|---|---|
| 3,510,014 | 5/1970 | Speaker et al. | 198/365 X |
| 3,589,501 | 6/1971 | Harrison | 198/365 |
| 3,662,874 | 5/1972 | Muller | 198/802 X |
| 3,669,245 | 6/1972 | Wooten et al. | 198/365 |
| 4,004,681 | 1/1977 | Clewett et al. | 198/365 |
| 4,089,404 | 5/1978 | Venzke | 198/365 |
| 4,139,088 | 2/1979 | Olesen | 198/365 |
| 4,635,785 | 1/1987 | Prydtz | 198/365 |

*Primary Examiner*—Robert J. Spar
*Assistant Examiner*—Cheryl L. Gastineau

[57] ABSTRACT

Apparatus for the overhead loading of one or more containers positioned on a straight or curved path proximate the apparatus, the apparatus having a support proximate the path, a transport rail structure on the support, a plurality of gondolas mounted on the support for movement therealong, the gondolas and containers being proportioned such that each container can accommodate the simultaneous dumping of at least two gondolas, and a tipple mechanism on each gondola for dumping the same.

9 Claims, 12 Drawing Sheets

MATERIAL LOADING APPARATUS

The invention concerns method and apparatus for overhead loading of bulk material delivered to the apparatus from a loading facility located within a mine tunnel or at or beyond the mine opening into containers such as railroad cars positioned on straight or curved sections of track, particularly where the containers are stationed or moving along a curved section of track and the apparatus is positioned substantially over the tops of the containers and, in a special embodiment, moving in a timed relationship thereto. The invention is not restricted to loading railroad cars and can be adapted to mining in general, earth moving, inventory operations or any other practical application whereby conveyor means is employed to move and dump bulk material in curves, inclines and straight paths into any type of container.

In mining operations wherein coal or other material is extracted from the mine in a substantially continuous manner it is desirable for the conveyor which carries the material out of the mine to be extended substantially over the top of railroad cars such that the material can be simply dumped into the cars in a substantially continuous but controlled manner in order to fill the cars according to a predesigned pattern, usually as uniformly as possible. Such conveying apparatus is simple to design and construct where the conveyor moves, for example, in a path parallel to a straight line movement of the cars, but is very difficult to provide where the cars are stationed or moving on a curved section of track which is very often the case in mining country where flat land is typically not found and track curvature is necessary. In this regard, there are belt conveying devices in the prior art where the conveyor moves in a path parallel to a substantially straight line of cars. Since belt conveyors are not readily adaptable to curves, it is very difficult to use them where the cars are located on a curved section of track, which, as aforesaid, is very often the case in mining country. See, for example, U.S. Pat. Nos. 1,920,500 and 2,832,482 which disclose extremely complex overhead type conveyors in an attempt to solve the problem of loading cars positioned on curved sections of track.

The present invention has as its objects therefore: to provide conveying apparatus which can substantially uniformly load material from overhead into containers (the term "containers" hereinafter including other dumping locations or structures) such as railroad cars stationed or moving in either a straight or curved path; to provide such apparatus in a form adaptable to mining or earth moving operations and loading facilities; and to provide such apparatus adaptable to either stop or go, or to continuous operation, partially within and partially exterior to a mine.

These and other objects hereinafter appearing have been attained in accordance with the present invention through the concept and apparatus for the overhead loading of one or more containers positioned on a straight or curved path proximate said apparatus, said apparatus comprising support means proximate said path, transport means on said support means, a plurality of gondolas mounted on said support means for movement therealong, said gondolas and containers being proportioned such that each container can accommodate the simultaneous dumping of at least two gondolas, and tipple means on said gondolas for dumping the same.

When the present apparatus is used to load containers such as railroad cars along a path, the material can be dumped into the containers along their entire length in a substantially continuous but controlled manner in order to fill the containers according to a uniform, preprogrammed pattern. Both in and outside a mine the apparatus can provide continuous, homogeneous transport of bulk material in curves, inclines and straight paths. In mining operations, it is possible and desirable for this conveyor to carry the material out of the mine to loading or dumping points anywhere along the length of the conveyor. If railroad cars are loaded at the mine opening using this conveyor it will eliminate the need for a hopper or holding bin alongside the track.

Further and preferred embodiments of the invention comprise the above described apparatus wherein:

Each gondola body is shaped with downwardly tapered side walls at one end and an upwardly slanted floor section at its other end to vertically nest with adjacent gondola bodies to accommodate pivotal motion thereof;

the transport means comprises a monorail and the gondola carriages are provided with wheel means for riding on said monorail;

each gondola is provided with tipple means which can opeate independently of or in coordination with the tipple means of other gondolas; and the tipple means comprises cooperating cam means on the gondola body and the gondola carriage, and hydraulic means is provided to pivot the body and carriage relative to each other whereby the cam means operates to tilt the body to a dump position.

The invention will be understood further from the following description and drawings wherein.

Referring to the drawings, the present apparatus comprises a support generally designated 10 which can be of any sturdy construction, i.e., solid base or frame type construction as exemplified by steel I beam uprights 12 and cross-pieces 14 upon which is secured the transport means or rail generally designated 16. These uprights are rigidly secured to a base such as the floor of a mine tunnel or the edge of a railroad bed by any convenient means including concrete foundations imbedded in the mine floor or railroad bed edge, and are provided in the number and positions required to insure proper support for a continuous loop of the rail 16. This support 10 including rail 16 is intended to provide a continuous track upon which the transport means (described below) for the gondolas ride. Within the context of the present invention, this track may extend into any portion of the mine and any distance outside of the mine to allow for loading of the gondolas within the mine and unloading or dumping outside of the mine. The height of uprights 12 may, of course, be varied to accommodate the varying heights of the mine ceiling and the required elevation of the track for overlying adjacent railroad cars 18 outside of the mine.

Figure 7:
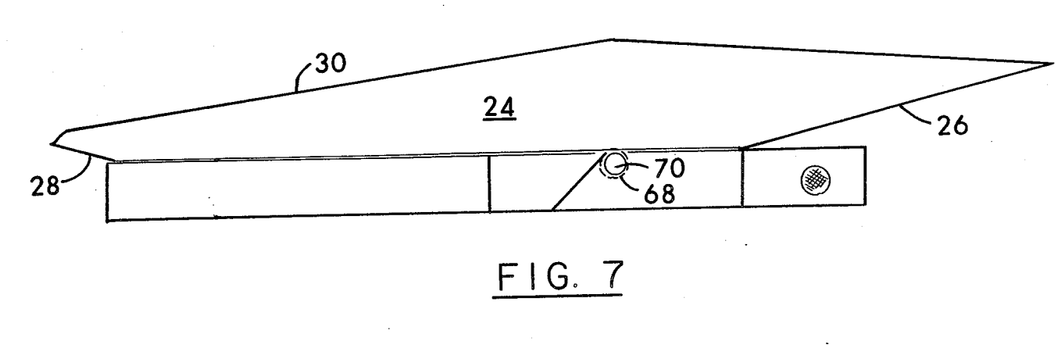
FIG. 7 is a side view of the gondola body.
Figure 8:
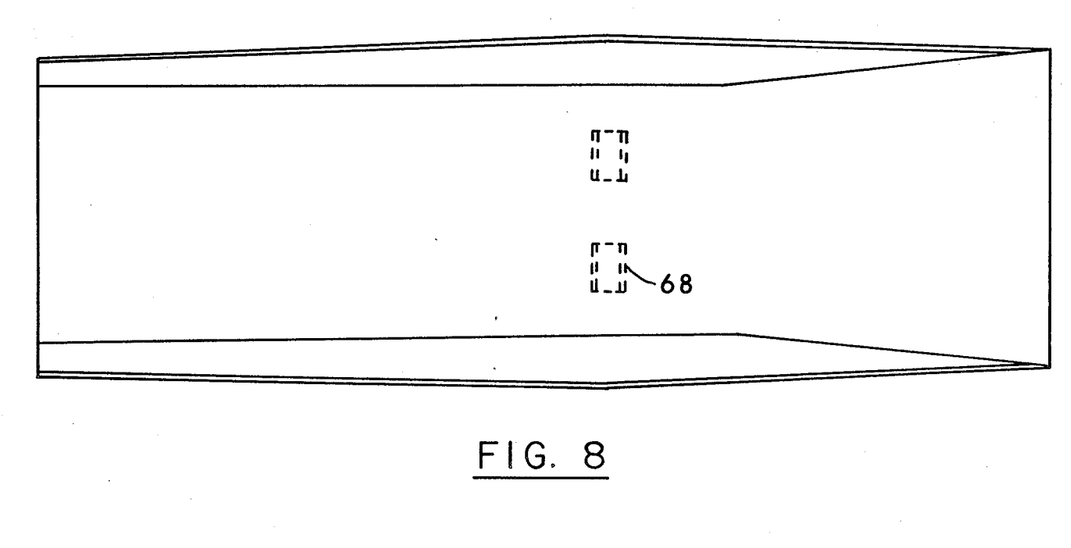
FIG. 8 is a top view of the gondola body.
Figure 9:
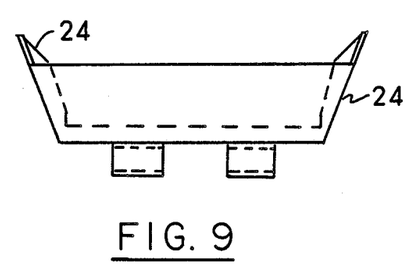
FIG. 9 is one end view of the gondola body.

Referring to FIGS. 7 and 8, each gondola generally designated 20 comprises a body generally designated 21 having floor 22 and side walls 24. The floor has an upwardly slanted portion 26 adjacent one end and an upwardly slanted portion 28 adjacent the other end, and the side walls have downwardly tapered rear portions 30. The walls 24 are preferably slanted outwardly slightly from bottom to top. This overall configuration of the gondola bodies has been found to be particularly suited to the present apparatus in their ease of rotation to and from their dump positions. It is particularly note that their generally low profile allows their use within mines having low ceiling clearances.

Figure 1:
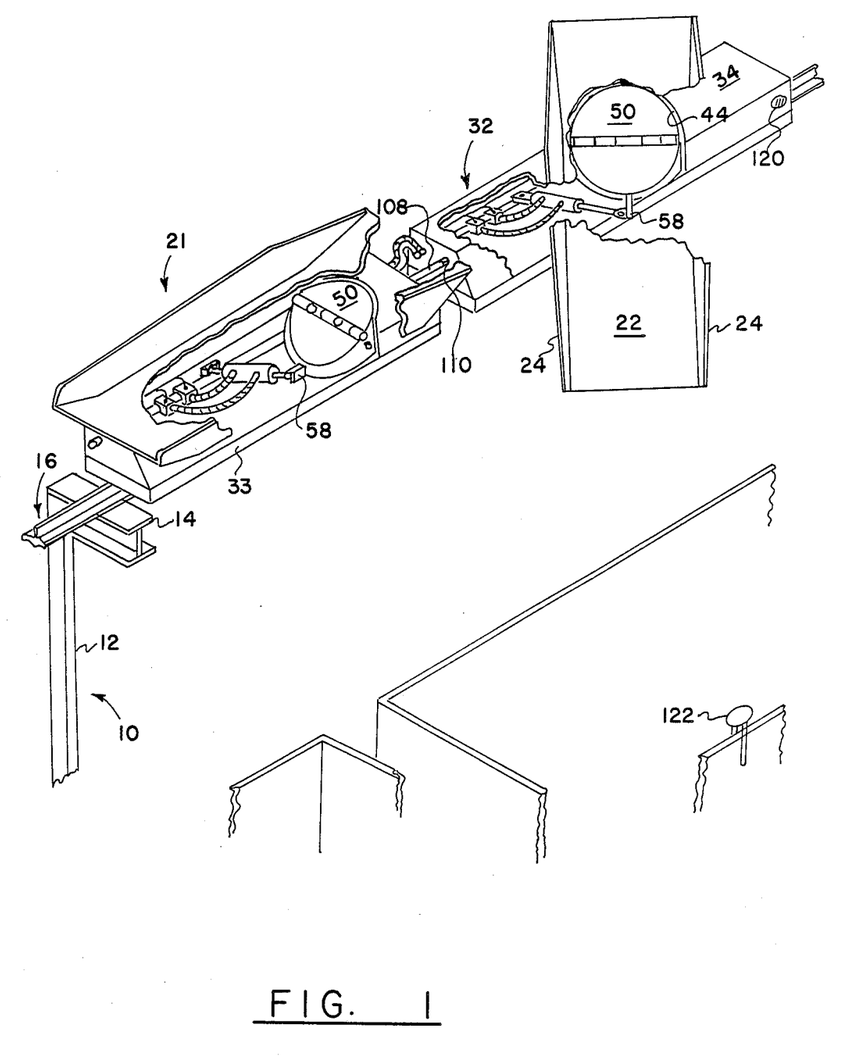
FIG. 1 is an isometric schematic view of the present apparatus showing the gondolas in partial section and positioned on a monorail overylying open railroad cars.
Figure 2:
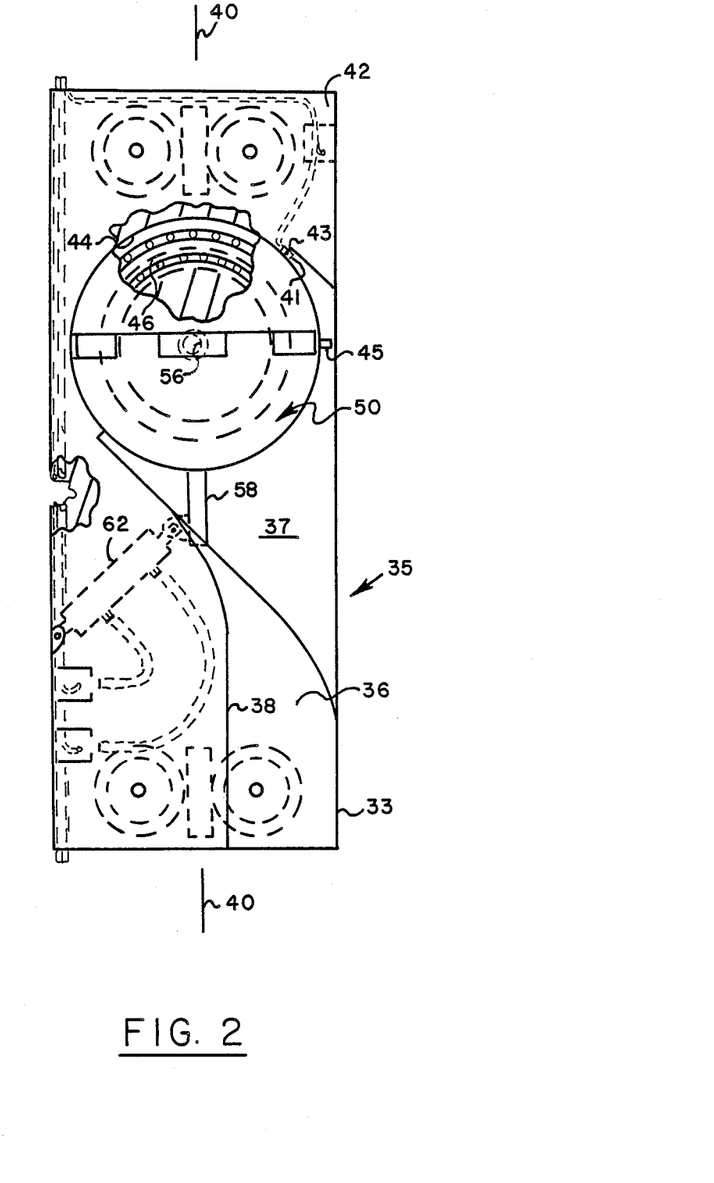
FIG. 2 is a top view of the gondola carriage with a variation of the rotator in place (gondola body removed)
Figure 3:
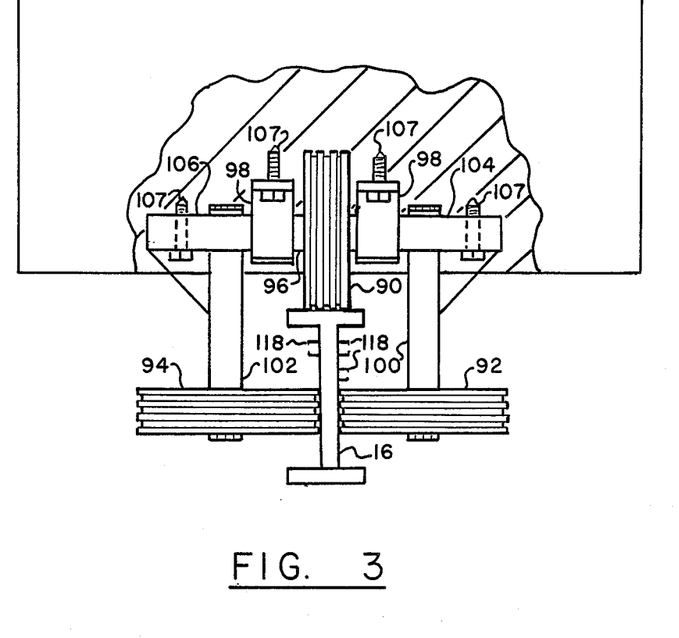
FIG. 3 is an end view of FIG. 2 with portions broken away to show the gondola transport means.

Each gondola also has a carriage generally designated 32 comprising a base 33 which may be in the form of a substantially solid block or in fabricated sheet steel or plastic (e.g. fiber glass) form. The fabricated sheet metal form is preferred from a weight standpoint. The upper surface 34 of the base in the embodiment of FIGS. 1–3 is generally flat but is provided with a recess generally designated 35 and formed by downwardly bevelled edge or surface 36 having its longitudinal starting line 38 slightly offset to the dumping side of the central longitudinal axis 40 of the carriage for a purpose hereinafter described. The lowermost portion 37 of recess 35 preferably ends short of the leading end 42 of the base at wall 43 also for a purpose hereinafter described.

Figure 4:
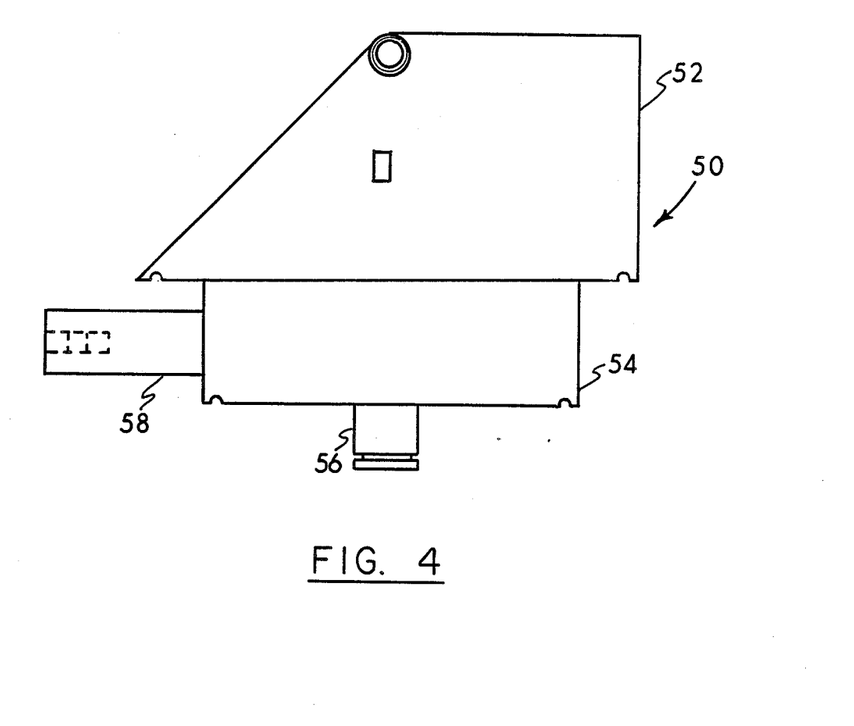
FIG. 4 is a side view of the gondola body rotator of FIG. 2.
Figure 5:
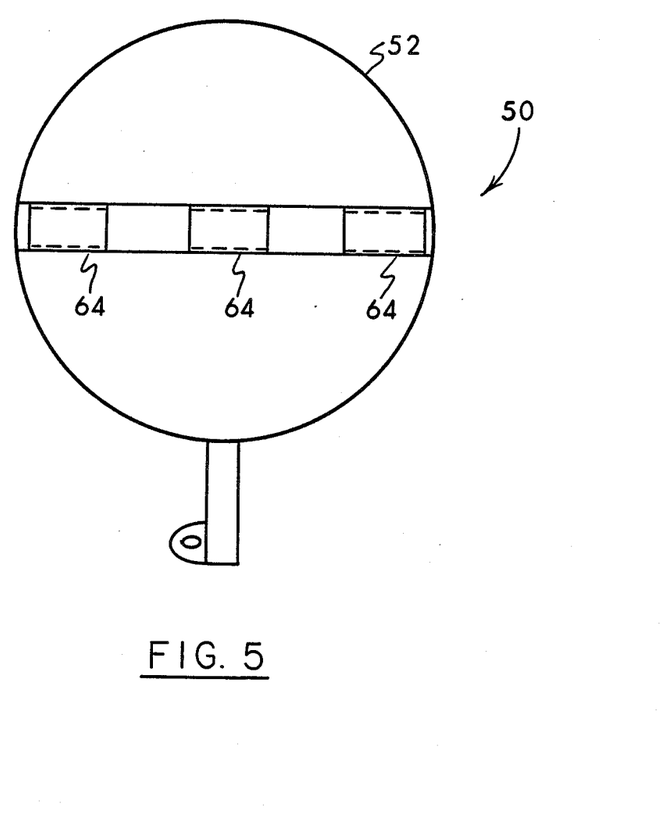
FIG. 5 is a top view of the gondola body rotator.
Figure 6:
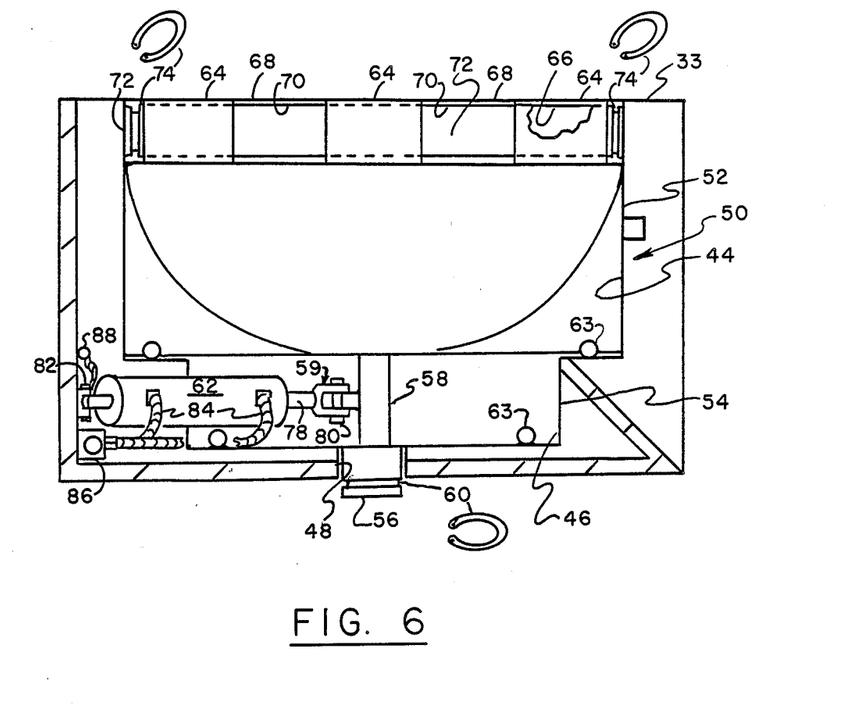
FIG. 6 is a front, partially sectioned view of the gondola body rotator of FIG. 2 and adjacent carriage portions.

With particular reference to FIGS. 2, 4, and 6, the tipple means will now be described. The carriage base 33 is provided with a rotator well 44, a rotator bearing recess 46 and a rotator shaft aperture 48. The rotator generally designated 50 comprises several interconnected elements, i.e., a support segment 52 for gondola body 21, a main shaft segment 54, a rotator mounting shaft 56 and a rotator arm 58. It is seen from FIGS. 4–6 that the rotator 50 nests within well 44 and bearing recess 46 with shaft 56 extending through aperture 48. This shaft is locked on to the bottom of the carriage base by any suitable means such a snap retaining ring 60. The rotator 50 is easily rotatable within the carriage base by means of rotator arm 58 which is pivotally connected by clevis means 59 to and actuable by double acting hydraulic cylinder 62. Ball bearings 63 may be provided to facilitate rotation of the rotator. The outward stroke of this cylinder rotates arms 58 and rotator 50 in a counter-clockwise direction as viewed in FIG. 2. It is obvious that the rotation direction can be chosen for the particular application of the present invention.

For the pivotal mounting of the gondola body 21 on the rotator 50, shaft journals 64 are machined on the upper surface of the rotator support segment 52 and provided with shaft bearing apertures 66. Mating shaft journals 68 having shaft bearing and apertures 70 are provided on the underside of the gondola body 21 and nest between journals 64. Shaft 72 extending through apertures 66 and 70 pivotally tie body 21 and rotator 50 together. The shaft 72 can be held in place by any suitable means such as snap retaining rings 74 on its ends well known to the art.

Figure 10:
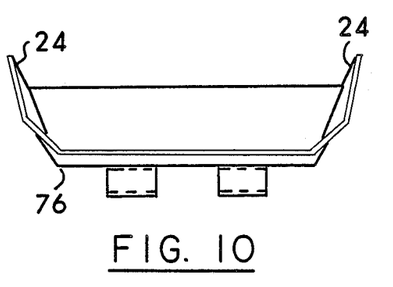
FIG. 10 is the other end view of the gondola body.

It is seen that as body 21 is rotated to its dump position as shown in FIG. 1, the downward pivoting of the body toward the container e.g. coal car 18 occurs as a result of the sliding of trailing edge 76 (FIG. 10) of the body off of line or edge 38 of the carriage on a diminishing radius from the pivotal axis of rotator 50 which thus allows the body to progressively tilt toward the container until stopped by wall 43 or other equivalent means abutted by stop 45 carried by the rotator. In order to facilitate this sliding action along edge 38, this edge as well as edge 76 of the body may be suitably curved or chamfered so to function smoothly in the nature of a cam and cam follower respectively. Such action is particularly desirable when the hydraulic cylinder is acting to retract the body to its up position. It is noted that the configurations of both of these edges as well as the floor of the body itself may be shaped as desired to achieve the best tilting action for a particular size body and load weight. In this respect, rollers or other anti-friction means may be provided on the carriage surface or body 21 to facilitate the tilting action.

The hydraulic cylinder 62 is a conventional double acting cylinder having its piston 78 connected to arm 58 by clevis pin 80 and its cylinder connected to carriage base 33 by clevis pin 82. Flexible hydraulic lines 84 and solenoid control valves 86 are connected into a master hydraulic line 88 which is preferable connected by suitable flexible conduits to all of the carriages in the same manner as described in known manner. The hydraulic feed source, i.e., pump, is conveniently positioned on one of the carriages to provide a self contained hydraulic circuit. The electrical control circuit for operating solenoids 86 is provided in known manner by sliding electrical contacts or remote control electrical switching type apparatus. It is noted that such hydraulic actuating means is not essential to the present invention and various mechanical type tilting mechanisms known to the art may be employed. The hydraulic means is preferred however, particularly because of its quick response to the control input signal which is important to providing flexibility to the operation and use of the present apparatus.

The transport means, with reference to FIGS. 2 and 3, cooperates with wheel units located adjacent each end of each gondola carriage. These units preferably comprises load wheel 90 and stabilizing wheels 92 and 94. Wheel 90 is fixed to axle 96 rotatably mounted in journal bearings or pillow blocks 98, and wheels 92 and 94 are fixed to axles 100 and 102 respectively rotatable mounted in journal bearings 104 and 106 respectively. All of the aforesaid journal bearings are rigidly affixed as by bolts 107 to base 33 of the carriage, and the shafts are fixed in position in their bearings, e.g., by eccentric lock collars on the pillow blocks.

The particular wheel unit shown for the transport means, as well as the specific monorail 16 construction may be varied, for example, to provide dual tracks and wheel units for accommodating gondolas or trucks such as are shown in the aforementioned U.S. patents and in other U.S. Pat. Nos. such as: 217,452; 1,944,993; 3,848,728; and 3,269,520 and the tilting and dumping mechanisms employed therein.

It is particularly noted that the present invention has as one of its principal objects and physical embodiments to provide not merely a workable, preferred monorail system for gondolas, but to provide a system which can continuously load containers such as railroad cars stationed or moving along any configured path, particularly a curved path in a highly controlled and accurate manner. To this end and with specific reference to FIG. 11, the gondolas are positionable in dumping positions substantially overlying the cars either stationed or moving along their tracks such that two or more gondolas may simultaneously or sequentially dump into a single car in such a manner that the coal or other material will be distributed in a more even manner throughout the length and breadth of the car. The apparatus is preferably provided with a control system to dump the gondolas in any sequence and into any car anywhere along the straight or curved section of railroad track that is contiguous the gondola supporting monorail or equivalent structure.

The gondolas are connected to each other by suitable pivotal connecting means known to the art such as hitch beam 108 and universal type joint connector 110 and affixed thereto and to the adjacent carriage base. It is particularly noted that the gondolas perform their functions equally well when travelling in either direction and, therefore, there is no set front or rear to the gondolas.

Figure 11:
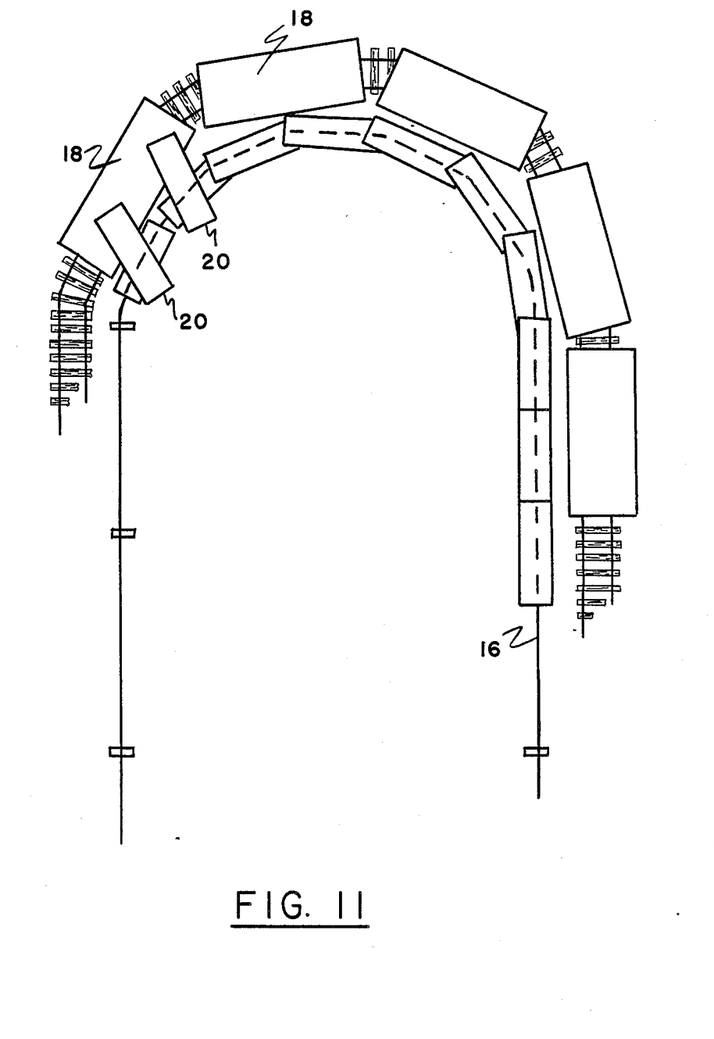
FIG. 11 is a schematic of the gondolas in operating position on a curve with respect to the railroad cars.
Figure 12:
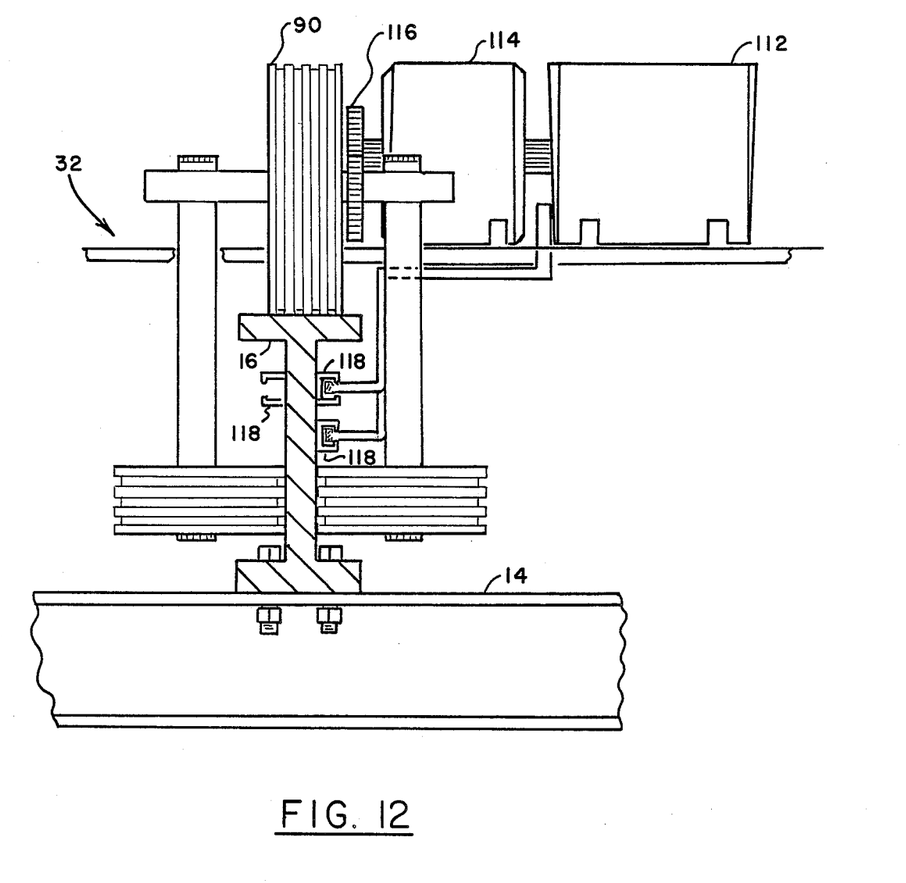
FIG. 12 is a partial cross-sectional view of the gondola which is used as the engine for all of the gondolas.

Referring to FIGS. 11 and 12, wherein structure equivalent to that of FIGS. 1–10 in similarly numbered, one of the gondolas (engine) is provided with an electrical motor 112 such as the three-phase shown, coupled to a suitable gear reducer 114 having a chain sprocket 116 for connection in known manner to one or more wheels of the engine. The electrical power to run motor 112 is obtained by sliding shoe collectors 118 running on the monorail 16. Such construction is well known to the art as shown in the accompanying brochure No. 4291961 of P & H AMERICAN MONORAIL, Harnischfeger Corp., P & H, Simpsonville, S.C.

Figure 13:
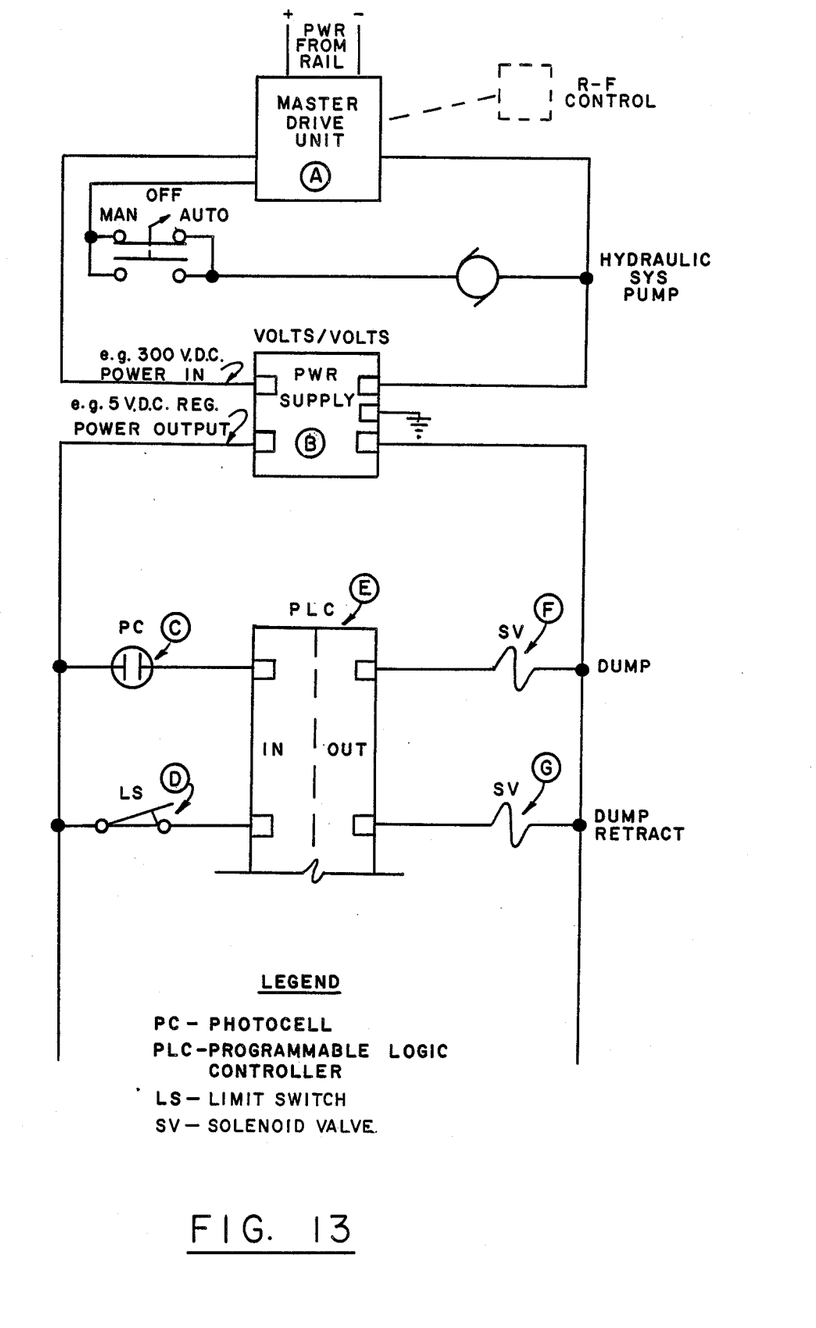
FIG. 13 is a schematic of a typical electric circuit for controlling the locomotion of the engine and the dumping of the individual gondolas.

Referring to FIG. 13, the locomotion (start-stop, etc.) of the engine (A) is controlled via radio frequency control using state of the art radio-servo devices as shown in the attached Honeywell Inc. Micro Switch Product Sheet FE-MLS5A. The secondary controls (B), (C), and (D) are fed from the same power source via reduced regulated voltage power supply. A conventional PLC, Programmable Logic Controller (E), is used as the systems intelligence. The PLC responds via photocell input which in turn signals an output (F) for dumping, and a mechanical limit switch such as 41 shown in FIG. 2, returns input (G) for the retracting device. Two PLC inputs and two PLC outputs are required for each dumping unit. The emitter of the retro-reflector photocell assembly 120 sends out a concentrated beam of light that strikes the corner reflector 122 which is mounted on the car to be loaded. The corner reflector reflects the beam back to the receiver of photocell assembly 120, which assembly then sends the dump signal to the PLC system which is mounted on the master unit (engine) and is cabled via connectors to each individual dumping unit. The corner reflector reflective assembly is typified as type OPB703A# shown in the accompanying Newark Electronics Catalog #108, pg. 141, copyright 1986, Chicago, Ill. 60640. Such reflector is portable and may be placed in any desired location on the vehicle to be loaded.

The hydraulic (fluid or air) system pump (preferably pressure regulated) is controlled automatically or manually by mechanical switching and is connected by hose from unit to unit in known manner.

The invention has been described in detail with particular reference to preferred embodiments thereof, but it will be understood that variations and modifications will be effected within the spirit and scope of this invention.

I claim:

1. Apparatus for the overhead loading of one or more containers positioned on a path proximate said apparatus, said apparatus comprising support means proximate said path, transport means on said support means for carrying a plurality of gondolas mounted thereon for movement therealong, each said gondola being comprised of a body and a carriage wherein the body is formed with a substantially flat floor section extending over a major portion of the overall length of the body, and with downwardly tapered side walls adjacent one end with an upwardly slanted floor section adjacent its other end to allow the ends of in-line gondolas to vertically nest in overlapping manner and accommodate individual pivotal motion of adjacent gondola bodies, and wherein the carriage is provided with a substantially flat top extending over a substantial portion of the overall length of the carriage, the said flat floor section and flat top being adapted for slidable engagement to provide support for heavy loads, pivot means pivotally connecting said body onto said carriage, said gondolas and containers being proportioned such that each container can accommodate the simultaneous pivoting and dumping of at least two gondolas, and tipple means on said gondolas for dumping the same, wherein said flat top terminates adjacent one side portion of said carriage and joins into a downwardly slanting camming surface upon which the flat floor section of said body is adapted to slide, wherein when the tipple means pivots the flat floor section relative to the flat top the downwardly slanting camming surface permits the body to tilt to a dump position wherein the body is supported thereon.

2. The apparatus of claim 1 wherein the transport means comprises a monorail and the gondola carriages are provided with wheel means for riding on top of said monorail.

3. The apparatus of claim 2 wherein each gondola is provided with tipple means which operates in coordination with the tipple means of other gondolas.

4. The apparatus of claim 3 wherein the tipple means comprises a hydraulic cylinder.

5. The apparatus of claim 1 wherein each gondola is provided with tipple means which operates independently of the tipple means of other gondolas.

6. The apparatus of claim 1 wherein shoulder means is provided on said carriage to limit the downward pivoting of said body.

7. The apparatus of claim 1 wherein said pivot means comprises a substantially shaft-like, rotator vertically mounted on said carriage for rotation about its vertical axis and having a diameter substantially equal to the width of said carriage, and cooperating bearing means on the upper end of said rotator and the floor of said body, said bearing means having a substantially horizontal axis.

8. The apparatus of claim 7 wherein the axis of said bearing of means lies below and immediately adjacent said flat top of said carriage to juxtapose said top and floor in substantial sliding contact.

9. The apparatus of claim 8 wherein said bearing means is positioned substantially on a diameter of said rotator and wherein an adjacent top surface of said rotator to one side of said diameter thereof is bevelled downwardly to accommodate the downward slant of said floor in the dump position of said body.

* * * * *